United States Patent
Mitchell

[11] 3,791,682
[45] Feb. 12, 1974

[54] TURBINE DRIVEN ELECTRICAL GENERATOR

[75] Inventor: Robert W. Mitchell, Houston, Tex.

[73] Assignee: Stewart & Stevenson Services, Inc., Houston, Tex.

[22] Filed: Aug. 23, 1972

[21] Appl. No.: 283,217

[52] U.S. Cl............................ 290/2, 290/52, 290/1, 60/39.31
[51] Int. Cl............................................. F01d 15/10
[58] Field of Search .......... 60/39.31; 290/2, 1.4, 52

[56] References Cited
UNITED STATES PATENTS

| 3,418,485 | 12/1968 | Anderson et al. | 290/52 |
| 3,612,598 | 10/1971 | Keslin | 290/52 |
| 2,443,054 | 6/1948 | Putz et al. | 60/39.31 |
| 2,511,854 | 6/1950 | Kane | 290/2 X |
| 3,453,443 | 7/1969 | Stoeckly | 290/2 |
| 3,638,421 | 2/1972 | Chilman | 60/39.31 |
| 2,405,352 | 8/1946 | Giger | 290/2 |
| 3,208,217 | 9/1965 | Sonder | 60/39.31 |
| 1,343,485 | 6/1920 | Shamberg | 290/1 A |
| 2,390,959 | 12/1945 | Pfenninger | 290/2 UX |

Primary Examiner—G. R. Simmons
Attorney, Agent, or Firm—Jefferson D. Giller; James F. Weiler; William A. Stout

[57] ABSTRACT

A turbine driven electrical driven generator set having one or more turbines positioned above the generator to provide a power source at locations where there is a minimum available floor space. An acoustical enclosure enclosing the turbine and generator and having air filters for filtering the generator cooling air and the intake air to the turbine. An air fan driven from the generator for cooling the generator and the oil in the turbine and the reduction gearing between the turbine and the generator through an air/oil heat exchanger. The air fan cooling the turbine after shutdown.

2 Claims, 10 Drawing Figures

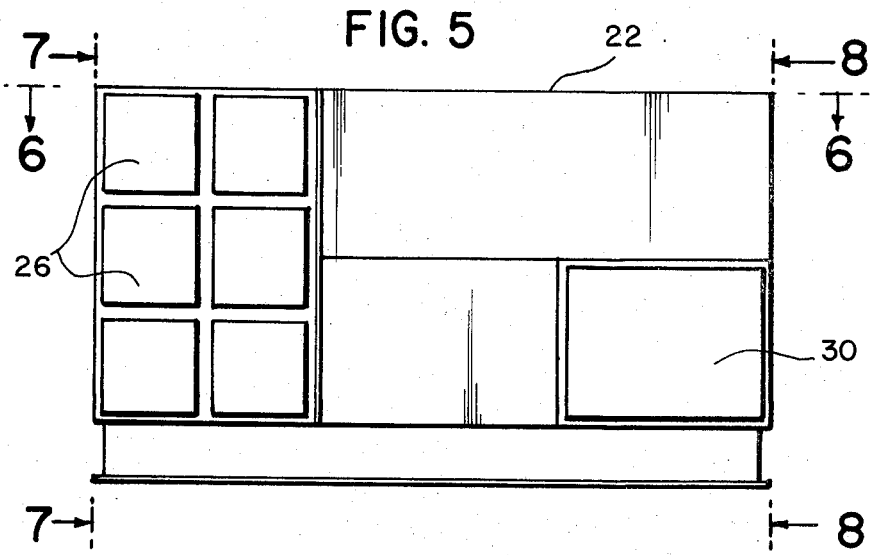
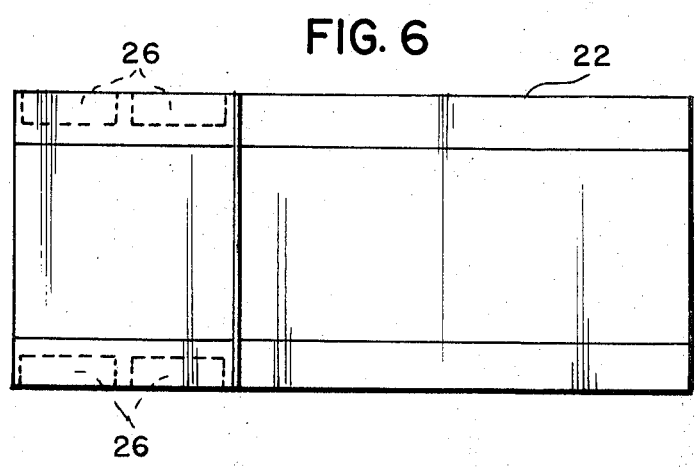
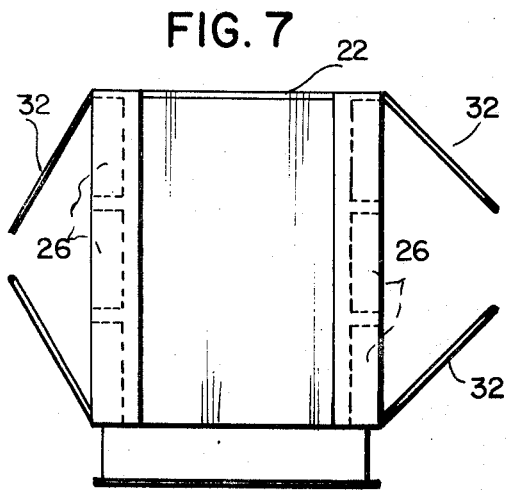
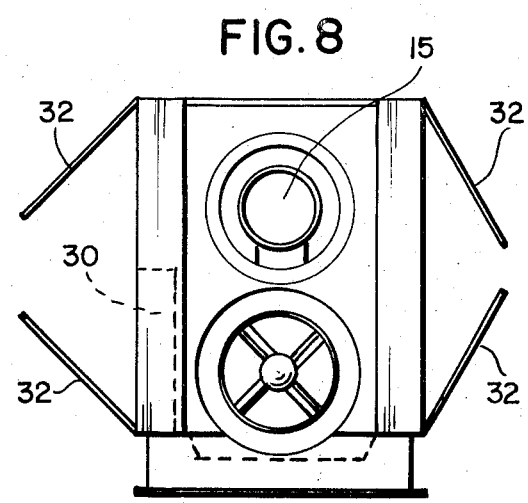

3,791,682

TURBINE DRIVEN ELECTRICAL GENERATOR

BACKGROUND OF THE INVENTION

The use of inline turbine driven generator sets is old. The present invention is directed to various improvements in a turbine driven electrical generator set that requires less floor space; has a low sound output level; provides an improved cooling system for the generator, turbine and gearing; and selectively allows the use of one or more turbines to obtain optimum specific fuel consumption.

SUMMARY

The present invention is directed to a turbine driven electrical generator set in which one of the features is the provision of positioning one or more turbines above the generator and connected to the generator by a vertical reduction gearing to provide a compact unit which requires a minimim of floor space as compared to inline units.

Another feature of the present invention is the provision of a turbine generator set having a low sound level output by enclosing the set in an acoustical enclosure having intake air filtering and silencing, and an exhaust silencer on the turbine output.

Another feature of the present invention is the improvement in a turbine generator set cooling system in which a fan is connected to the alternator to provide an adequate air flow for generator cooling and also sufficient air flow through an air/oil heat exchanger for cooling the turbine engine and gearing oil cooling. In addition, the fan may be used for cooling the turbine after shutdown when air is not flowing through the turbine by providing an openable passageway in communication between the fan inlet and the turbine compartment.

Other and further objects, features and advantages will be apparent from the following description of the present invention.

BRIEF DESCRIPTION OF THE DRAWINGS

FIG. 5 is an elevational view of the outside of the enclosure of the present invention, FIG. 6 is a cross-sectional view taken along the line 6—6 of FIG. 5, FIG. 7 is a cross-sectional view taken along the line 7—7 of FIG. 5 and showing the access panels open, FIG. 8 is a cross-sectional view taken along the line 8—8 of FIG. 5 showing the access panels open.

DESCRIPTION OF THE PREFERRED EMBODIMENT

Figure 1:
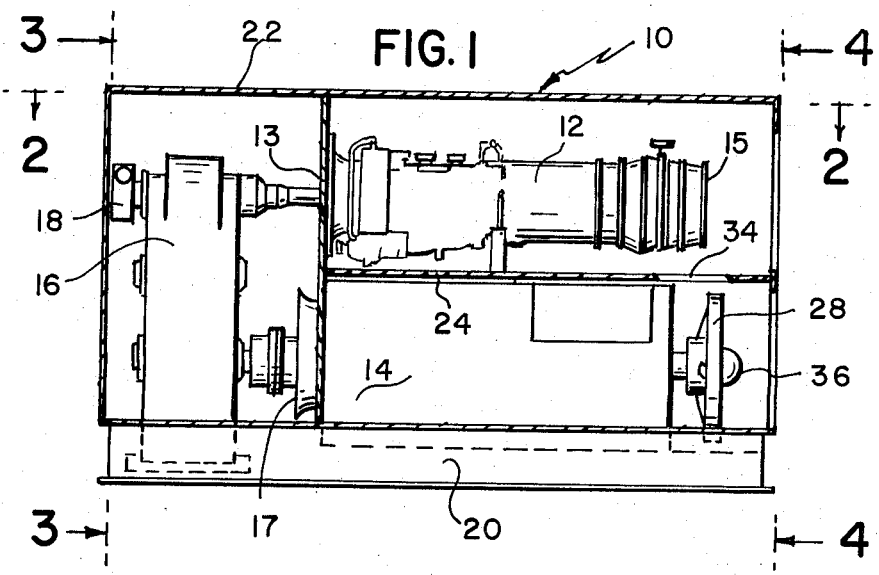
FIG. 1 is an elevational view of the present invention with the side enclosures removed.
Figure 2:
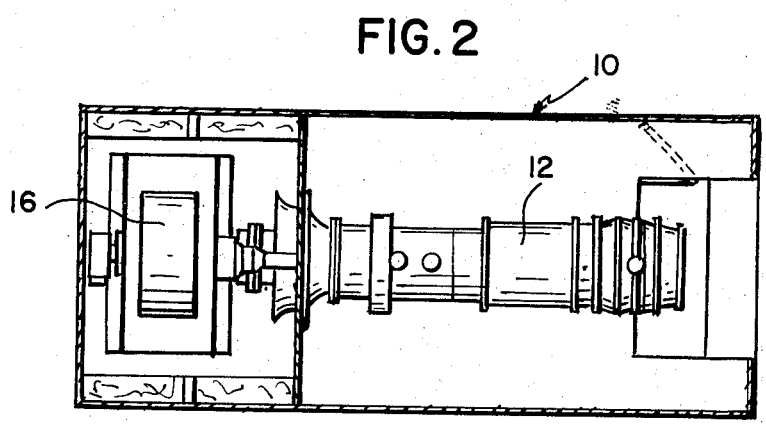
FIG. 2 is a cross-sectional view taken along the line 2—2 of FIG. 1.
Figure 3:
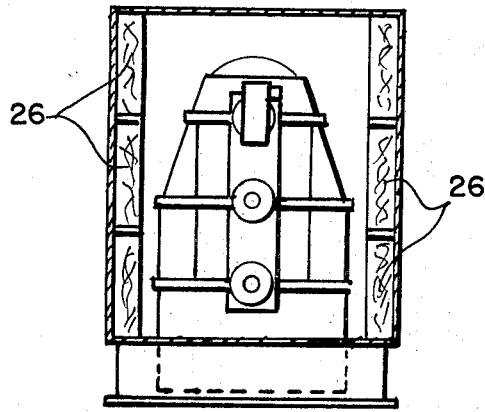
FIG. 3 is a cross-sectional view taken along the line 3—3 of FIG. 1.
Figure 4:
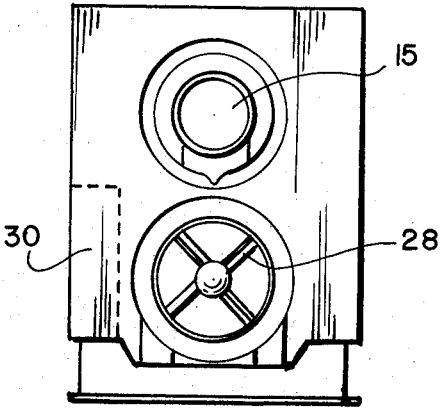
FIG. 4 is a cross-sectional view taken along the line 4—4 of FIG. 1.

Referring now to the drawings, and particularly to FIGS. 1–4, a gas turbine generator set is generally indicated by the reference numeral 10 for providing an electrical power plant in which the components are "stacked" to utilize a minimim of floor space which is particularly desirable for applications such as a prime mover for offshore drilling or production platforms and for other new or existing facilities where floor space is at a premium. The set 10 generally includes a turbine 12 for driving an electrical generator 14 through vertical reduction gearing 16. Both the turbine 12 and the generator 14 are horizontally positioned, but the turbine 12 is positioned through the vertical reduction gearing 16. In one embodiment of a 2,500 KW set, the set measured 14 feet long, 8 feet high and 6 feet wide, thereby requiring only approximately 40 percent of the floor space normally required for a unit of such size. In such embodiment the turbine 12 was a GM Detroit Diesel Allison Model 501K while the generator 14 was an Ideal 1,800 rpm, four pole, three phase 60 cycle, 4,160 volt power alternator.

The reduction gearing 16 may include the necessary gearing for reduction from a turbine speed of 13,280 rpm to 1,800 rpm alternator speed. Any suitable means for starting the turbine 12 may be provided such as an air starter 18.

The apparatus 10 is mounted on a steel base 20 within an acoustical enclosure 22 having suitable sound insulating panels to provide a low sound level output. The enclosure 22 includes a partition 24 separating the turbine 12 and the generator 12 into separate compartments. The enclosure 22 also includes a plurality of air filters 26 such as Donaldson filters for filtering the gas turbine combustion air and the generator 14 for cooling air as well as acting as a silencer for the air inlets. The air passes through the filters 26 into the turbine inlet 13 and out the turbine exhaust 15 and also to the generator air inlet 17. Suitable access doors 32 are provided on the enclosure for access of maintenance and minor repairs.

The cooling system for the generator 14 utilizes a high efficiency air foil type fan 28 driven directly from the exciter end of the generator 14 to draw air through an inlet 17 to the generator 14 and exhausting the air out of the generator 14 at the same end of the apparatus 10 as the exhaust 15 from the turbine 12. The cooling fan 28 not only provides adequate air flow for generator cooling, but provides an air flow through an air-/oil heat exchanger 30 in which the oil from the turbine engine 12 and the cooling oil from the reduction gearing 16 is connected and cooled. The use of the fan 28 for cooling both the generator 14 and the turbine and gear box oil is accomplished by sizing the inlet 17 to the generator to insure that an adequate amount of cooling air will flow over the air/oil heat exchanger 30. In the 2,500 KW embodiment previously mentioned, a fan having a discharge of 31,000 cfm provided 9,000 cfm air cooling for the generator 14 and 22,000 cfm of cooling air for the exchanger 30.

When the set 12 is shut down, the cooling air through the turbine 12 also stops. In order to provide cooling of the turbine 12 subsequent to shutdown, the partition 24 may include an openable passageway 34 adjacent the inlet of the fan 28 which can be opened manually or by suitable switching means on turbine shutdown. Normally, ventilating of the compartment of the turbine 12 for approximately 5 minutes after each shutdown is sufficient to provide the desirable cooling. After shutdown, the fan 28 is driven by an electric motor 36 having a sprague clutch from a separate power supply (not shown) to provide the desired cooling.

Figure 9:
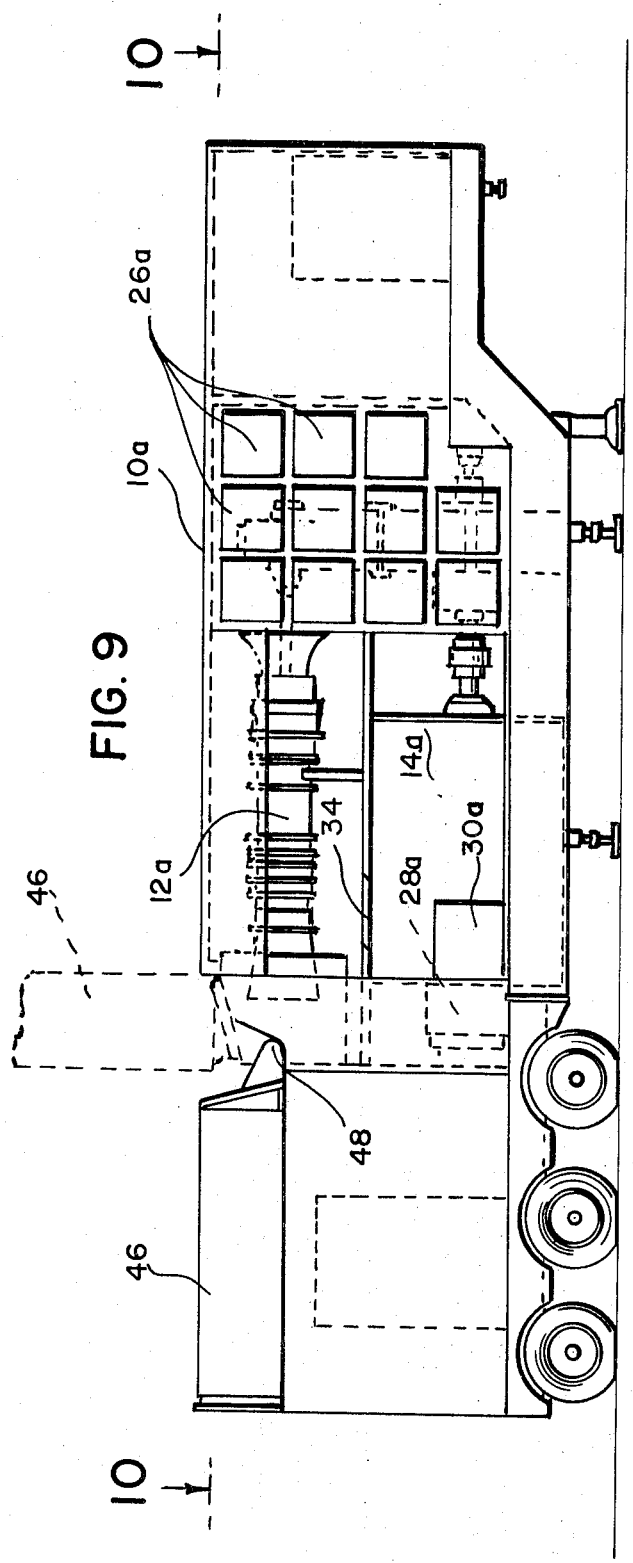
FIG. 9 is an elevational view, partly in cross section, illustrating another embodiment of the present invention shown in mobile form.
Figure 10:
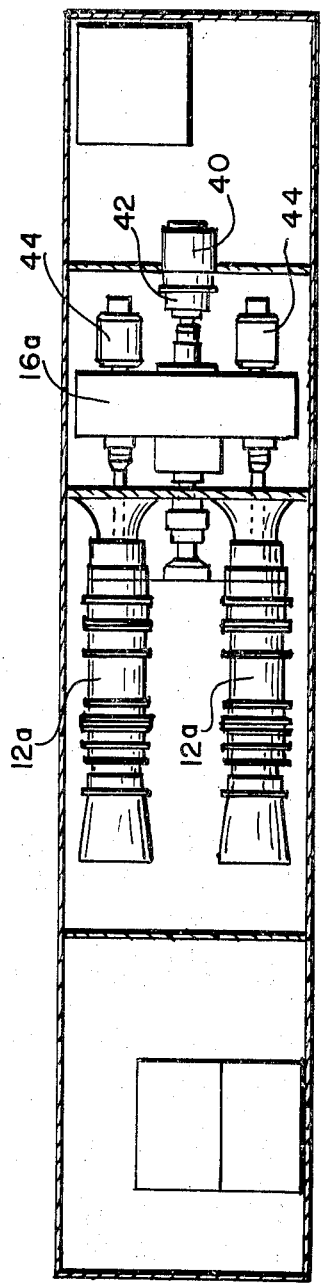
FIG. 10 is a cross-sectional view taken along the line 10—10 of FIG. 9.

Of course, other and further modifications of the present invention can be made one of which is shown in FIGS. 9 and 10 where like numerals are applied to like parts shown in FIGS. 1-8 with the addition of the suffix a. The turbine generator 10a of FIGS. 9 and 10 is mobile, shown being trailer-mounted. In one specific embodiment providing 6,000 KW of power the trailer was sufficiently compact to meet the ICC dimensional limits with an overall length of 40 feet, width of 8 feet, and overall height of 13 feet 2 inches. In this embodiment, two turbines 12a were provided, both of which were stacked above the generator 14a and connected to the generator 14a through gearing 16a. The dual turbine engines 12a are advantageous in that during periods of light loading only one of the turbine engines 12a need be operated, thus allowing the set 10a to deliver optimum specific fuel consumption. An electric starting motor 40 is provided for starting each of the turbine motors 12a individually through a torque converter 42, and separate clutches 44 are provided for connecting each of the turbines 12a to the gearing 16a.

In addition, a turbine exhaust silencer 46 may be provided adjacent the exhaust from the turbines 12a for reducing the noise level of the unit 10a. If desired, the silencer 46 may be pivotally connected about point 48 and raised by suitable controls to the dotted position for directing the turbine exhaust vertically.

The present invention, therefore, is well adapted to obtain the ends and advantages mentioned as well as others inherent therein. While presently preferred embodiments of the invention are given for the purpose of disclosure, numerous changes in the details of construction and arrangement of parts may be made which are within the spirit of the invention and the scope of the appended claims.

What is claimed is:

1. A turbine driven electrical generator set comprising, an electrical generator horizontally positioned, a turbine horizontally positioned above and on top of the generator, vertical reduction gearing connected between the turbine and the generator, an acoustical enclosure enclosing the turbine and the generator including air filters for filtering the generator cooling air and the intake air to the turbine, an air fan connected to and driven from the generator, auxiliary power means to drive fan after turbine shutdown, an enclosure enclosing the turbine and the generator including a partition between the turbine and the generator, said partition including an openable passageway in communication with the fan inlet for being opened for cooling the turbine after shutdown.

2. A turbine driven electrical generator set comprising, an electrical generator horizontally positioned, a turbine horizontally positioned above and on top of the generator, vertical reduction gearing connected between the turbine and the generator, an air fan connected to and driven from the generator for drawing cooling air through the generator, an air/oil heat exchanger having an air inlet and air outlet and connected to the oil in the turbine and the reduction gearing, and positioned with the exchanger air outlet adjacent the air fan inlet for air cooling the exchanger, the exchanger air inlet positioned to receive cooling air separate from the cooling air passing through the generator, and an acoustical enclosure enclosing the turbine, the generator, and the heat exchanger including air filters for filtering the generator cooling air, the air intake to the turbine, and the cooling air to the exchanger air inlet.

* * * * *